United States Patent Office 3,119,254
Patented Jan. 28, 1964

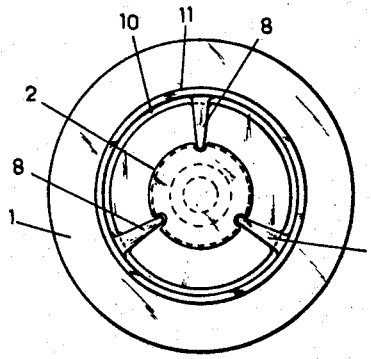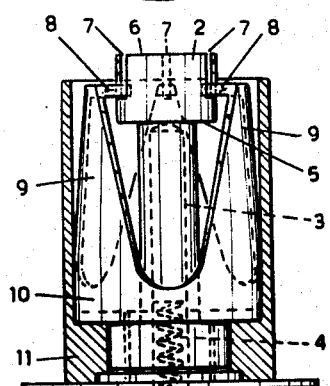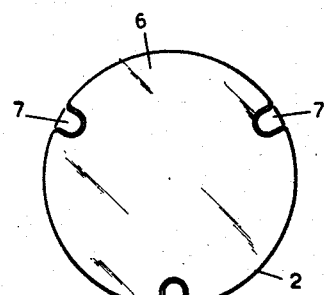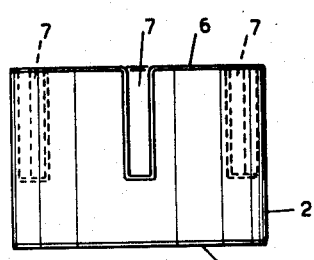

3,119,254
TRANSDUCER
Robert J. Schliekelmann, Amstelveen, and Dick H. van
Graas and Antonius van Poppelen, Haarlem, Netherlands, assignors to N.V. Koninklijke Nederlandse
Vliegtuigenfabriek Fokker, Amsterdam, Netherlands
Filed June 29, 1960, Ser. No. 39,673
Claims priority, application Netherlands May 13, 1960
3 Claims. (Cl. 73—71.5)

The invention relates to a transducer for the non-destructive testing of objects which are provided with plate bonds, and in particular adhesive bonds between metal plates. Such tests are of great importance for airplane construction in which bonds formed by an adhesive on a thermosetting artificial resin base between light metal plates are frequently used. The non-destructive testing for the tensile strength and shear strength of the layer heretofore has involved great difficulty. To effect such testing, mechanical vibrations have been used by vibration generator or a transducer coupled locally to the object, containing a piezo-electric crystal, particularly barium titanate having one or more resonance peaks. The crystal is excited by means of a frequency modulated electrical oscillation of constant amplitude, having a frequency swing of oscillation which may vary for example from 150 to 300 kc., incorporating at least one of said resonance peaks, the electric voltage over the crystal as a function of the frequency being shown on a cathode ray oscillograph. A device for practicing this method is shown in U.S. Patents 2,846,874 and 2,851,876. In the case of the known device, comparative tests are made between standard samples and the objects to be tested. Thereby, the condition of the objects is determined by the correspondence of resonance peaks of the crystal for the standard sample and the objects as viewed on an oscillogram.

The invention is particularly concerned with a transducer for converting electrical into mechanical vibrations for the non-destructive testing of objects by means of a polycrystalline, piezo-electric disc, particularly of barium titanate, which transducer is provided with mutually insulated electrodes on end faces, and wherein said disc is arranged in a holder. A transducer of the general type is shown in U.S. Patent 2,851,876.

With the known transducer the disc is supported in the holder by means of a resilient adhesive which is applied to the disc. The disadvantage of such a support is that it causes a strong damping of radial vibrations of the crystal. For this reason the known transducer is less suitable for the generation of such radial vibrations of the crystal, which, however, can be very useful for testing the shear strength of plate bonds. Another disadvantage of the known transducer lies in the fact that, when the axis of the transducer is placed in a direction deviating from the perpendicular direction on the surface of the plate bond to be tested, only relatively slight deviations can be accommodated by the resilient adhesive bond. This makes it possible that incorrect measurements will be made if the transducer is used by unskilled personnel.

It is an object of the invention to avoid the above-mentioned disadvantages inherent in transducers of the above-mentioned known type.

The transducer according to the invention is characterised in that a holder furnishing support for the disc comprises a resilient member pressing centrally against the interior end face of the disc and of three or more strip members resting accommodated in grooves in the disc. In this way the above-mentioned object is fully attained. Undesired damping of radial vibrations of the crystal is avoided, while the crystal is self adjusting in position in the holder in such a way that, considerable deviations of the axis of the holder with respect to the direction perpendicular on the plate surface, can be permitted without incurring any error in the obtained measurements.

According to a specific embodiment of the transducer according to the invention, there are provided metal strips, provided with end pieces accommodated in grooves in the disc. The grooves extend longitudinally from the exterior end face of the disc ending at some distance from the interior end face of the disc. Preferably the electrode on the exterior end face of the disc is connected to said metal strips by a conducting electrode layer in said grooves. By doing so it becomes superfluous to connect the plate, on which the transducer is placed during the test, to the measuring circuit. Preferably the electrode in the exterior end face of the disc is connected to a grounded location in the measuring circuit.

With the transducer according to the invention it is preferred to construct said metal strips as rigidly as possible. Preferably they have a part circular cross section and converge longitudinally.

The invention will be more fully explained in conjunction with an embodiment of the invention as shown in the drawing wherein:

FIGURE 1 is a side-view partly in cross-section of a transducer according to the invention.

FIGURE 2 is a top-view of the transducer in FIGURE 1.

FIGURES 3 and 4 show, on an enlarged scale, respectively a top view and a side-view of the piezo-electric disc.

In the drawing there is shown a hull made from insulation material on which is supported the holder for the polycrystalline piezo-electric transducing element 2, which preferably is barium titanate. The piezo-electric disc 2 is centrally urged away from the hull by a metal pin 3, acted upon by spring 4 and engaging the interior end face of the disc 2. The interior end face of the disc 2 is provided with a metallic electrode 5, and the exterior end face is provided with a metallic electrode 6. The outer face of the disc 2 is provided with three longitudinal grooves 7, terminating at some distance above the interior end face of the disc 2. The electrode 6 of the exterior end face extends into the grooves 7. In grooves 7 are accommodated end pieces 8 of metal strips 9, which are joined at their lower ends to form a cylindrical surface 10.

The electrode 6 of the disc 2 is electrically connected to the metal strips 9 via the pieces 8 accommodated in the grooves 7 and in contact with the electrode therein. A two-wire cable (not shown) supplies a high frequency alternating voltage to the electrodes 5, 6, by being connected to the lower end of the metal compression spring 4, and to the metal strips 9. An isolating hull 11 encloses strips 9 and surface 10.

The polycrystalline piezo-electric disc 2 is supported such that mechanical vibrations of the disc, especially radial vibrations, are practically undamped by the holder. Moreover, the axis of the disc 2 can make relatively large angles with respect to the axis of the hull 1, without disturbing the function of the transducer. In undergoing angular movement with respect to the axis 1 the disc 2 moves down with respect to one or two end pieces 8, which in turn move up in the grooves 7.

Furthermore it may be observed, that the piezo-electric disc 2 can easily be replaced by separating strips 9 and hull 11 from the hull 1, thereby leaving the disc 2 free for replacement.

What we claim is:
1. A transducer for transducing electrical vibrations into mechanical vibrations for non-destructive testing of objects, said transducer comprising a poly-crystalline piezo electric disc of barium titanate, said disc having end faces, mutually insulated electrodes on the end faces of said discs, holding means for the disc comprising a holder and a resilient member pressing centrally against one of the end faces of the disc and maintaining the disc in said holder with the other of the faces of the disc freely projecting beyond the holder, the holder including three strips, the disc being provided with grooves extending from the other end face of the disc to a position spaced from said one end face of the disc, the strips being loosely fitted in said grooves to hold said disc in position while permitting tilting of the disc with respect to the holder and substantial free radial movement of the disc.

2. A transducer according to claim 1 comprising a conducting layer in said grooves, the electrode on the other end face of the disc being connected to said strips through the conducting layer in said grooves.

3. A transducer according to claim 1 wherein the strips are in part circular in cross section and converge with one another longitudinally.

References Cited in the file of this patent

UNITED STATES PATENTS

| | | |
|---|---|---|
| 2,431,233 | Erwin | Nov. 18, 1947 |
| 2,761,076 | Hansell | Aug. 28, 1956 |
| 2,846,874 | Horn | Aug. 12, 1958 |
| 2,851,876 | Arnold | Sept. 16, 1958 |
| 2,903,886 | Renaut | Sept. 15, 1959 |
| 3,016,735 | Arnold et al. | Jan. 16, 1962 |